(12) United States Patent
Zhu et al.

(10) Patent No.: US 9,277,493 B2
(45) Date of Patent: Mar. 1, 2016

(54) MANAGING COMMUNICATIONS IN MULTIPLE RADIO ACCESS NETWORKS

(71) Applicant: Intel Corporation, Santa Clara, CA (US)

(72) Inventors: Jing Zhu, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 14/122,963

(22) PCT Filed: Aug. 12, 2013

(86) PCT No.: PCT/US2013/054557
§ 371 (c)(1),
(2) Date: Nov. 27, 2013

(87) PCT Pub. No.: WO2015/023253
PCT Pub. Date: Feb. 19, 2015

(65) Prior Publication Data
US 2015/0043349 A1    Feb. 12, 2015

(51) Int. Cl.
*H04W 24/00*    (2009.01)
*H04W 84/12*    (2009.01)
*H04L 12/28*    (2006.01)
*H04W 48/18*    (2009.01)

(52) U.S. Cl.
CPC .................................. *H04W 48/18* (2013.01)

(58) Field of Classification Search
CPC ..... H04W 24/00; H04W 80/04; H04W 84/12; H04W 72/04; H04L 47/10; H04L 12/28
See application file for complete search history.

(56) References Cited

U.S. PATENT DOCUMENTS

| 2005/0111462 | A1* | 5/2005 | Walton et al. ............... 370/395.4 |
| 2006/0111118 | A1* | 5/2006 | Hirvonen et al. ............. 455/450 |
| 2007/0076608 | A1* | 4/2007 | Samuel et al. ................ 370/230 |
| 2007/0217406 | A1* | 9/2007 | Riedel et al. .................. 370/389 |
| 2008/0159232 | A1* | 7/2008 | Thalanany et al. ........... 370/332 |

(Continued)

OTHER PUBLICATIONS

Universal Mobile Telecommunications System (UMTS); IP Flow Mobility and Seamless Wireless Local Area Network (WLAN) Offload; Stage 2, 3GPP TS 23.261 Version 101.0 Release 10, May 2011, 24 pgs.

*Primary Examiner* — Andrew Lee
(74) *Attorney, Agent, or Firm* — Schwabe, Williamson & Wyatt, P.C.

(57) ABSTRACT

Embodiments of the present disclosure describe techniques and configurations for managing communications in a radio access network. An apparatus may include computer-readable media having instructions and one or more processors coupled with the computer-readable media and configured to execute the instructions to measure flow context information based on data extracted from an internet protocol (IP) data flow between a user equipment (UE) and a network entity, and provide the measured flow context information to the UE to facilitate management of one or more IP data flows by the UE. The management of the IP data flow may include selecting a radio access network from one or more radio access networks available for communicating the IP data flow between the UE and the network entity, based at least in part on the provided flow context information. Other embodiments may be described and/or claimed.

18 Claims, 8 Drawing Sheets

(56) References Cited

U.S. PATENT DOCUMENTS

| | | | |
|---|---|---|---|
| 2009/0036128 A1* | 2/2009 | Raguparan et al. | 455/436 |
| 2010/0135330 A1* | 6/2010 | Liang et al. | 370/477 |
| 2010/0220665 A1* | 9/2010 | Govindan et al. | 370/329 |
| 2012/0204253 A1* | 8/2012 | Sugimoto et al. | 726/12 |
| 2013/0041994 A1* | 2/2013 | Terrien et al. | 709/223 |
| 2013/0144906 A1* | 6/2013 | Bhupalam et al. | 707/771 |
| 2014/0233384 A1* | 8/2014 | Howard | 370/235 |
| 2014/0302850 A1* | 10/2014 | Young et al. | 455/436 |

* cited by examiner

MANAGING COMMUNICATIONS IN MULTIPLE RADIO ACCESS NETWORKS

CROSS REFERENCE TO RELATED APPLICATIONS

The present application is a national phase entry under 35 U.S.C. §371 of International Application No. PCT/US2013/054557, filed Aug. 12, 2013, entitled "MANAGING COMMUNICATIONS IN MULTIPLE RADIO ACCESS NETWORKS", the entire disclosure of which is hereby incorporated by reference in its entirety.

FIELD

Embodiments of the present disclosure generally relate to the field of wireless communication systems, and more particularly, to techniques and configurations for managing communications in multiple radio access networks.

BACKGROUND

Interactions between wireless devices and wireless communication networks in which the devices operate may be conducted via different radio access networks. Today's mobile client wireless devices such as laptops, smartphones, ultrabooks, tablet computers and the like may be equipped with components (e.g., Wi-Fi and cellular radios) configured to provide the wireless device with access to different radio access networks (e.g., wireless networks such as Wi-Fi and cellular network) simultaneously. However, it may be challenging to efficiently integrate multiple radio access networks, e.g., Wi-Fi and cellular networks, and provide end users sufficient bandwidth for communications via the radio access networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide data techniques and configurations in a wireless communication network including techniques and configurations for selecting a radio access network and enhancing bandwidth for UEs (e.g., client wireless devices) operating in multiple radio access networks. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable circuit components that provide the described functionality.

Example embodiments may be described herein in relation to wireless communication networks including networks such as 3$^{rd}$ Generation Partnership Project (3GPP) Long-Term Evolution (LTE) networks including any amendments, updates, and/or revisions, (e.g., LTE Release 10, also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), such as Wi-Fi, wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, eNBs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
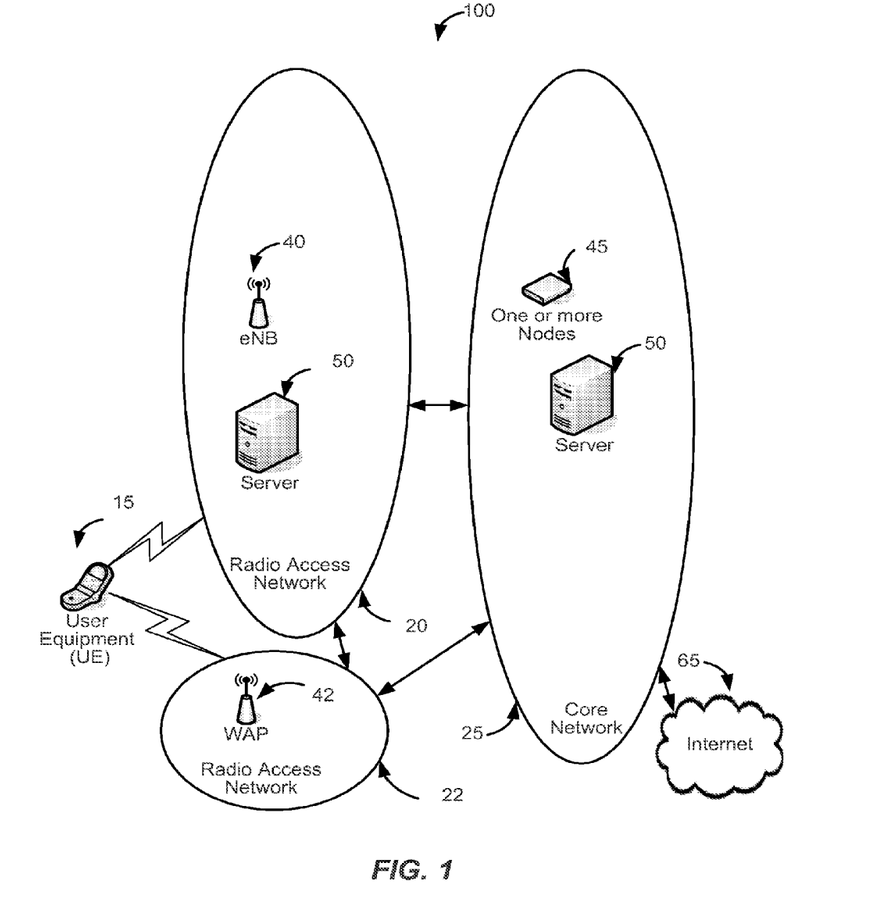
FIG. 1 illustrates an example wireless communication network in accordance with some embodiments.

FIG. 1 schematically illustrates an example wireless network 100 in accordance with some embodiments. The network 100 may include one or more radio access networks (RANs) 20 and 22, and a core network 25. In some embodiments, the network 100 may be an LTE network; the RAN 20 may be a cellular network, such as E-UTRAN, and alternatively be referred to as 3GPP access network 20; the RAN 22 may be a wireless local area network (WLAN) and alternatively be referred to as WLAN 22, such as Wi-Fi or other peer-to-peer (P2P) network, and the core network 25 may be an evolved core network such as EPS (Evolved Packet System). A client wireless device (hereinafter "User Equipment" (UE)) 15 may access the core network 25 via a radio link ("link") with an eNB 40 in the RAN 20 or via a wireless access point (WAP) 42 of the RAN 22 (e.g., Wi-Fi).

The UE 15 may be, for example, a subscriber station (e.g., a mobile wireless device) that is configured to communicate with the eNB 40 (wireless access points 42), in conformance with one or more protocols. One or more antennas of the UE 15 may be used to concurrently utilize radio resources of multiple respective component carriers (e.g., which may correspond with antennas of base stations such as eNB 40 or WAP 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a mobile device (e.g., a cellular phone), in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In an embodiment, the UE 15 may be a Machine Type Communication (MTC) device, also known as machine-to-machine device. In the present disclosure, the terms "UE," "client," and "(mobile) wireless device" will be used interchangeably for simplicity purposes.

In some embodiments, communication with the UE 15 via RAN 20 may be facilitated via one or more nodes 45 (e.g., Radio Network Controllers). The one or more nodes 45 may act as an interface between the core network 25 and the RAN 20 (22). According to various embodiments, the one or more nodes 45 may include a Mobile Management Entity (MME) that is configured to manage signaling exchanges (e.g., authentication of the UE 15 and NAS (non-access stratum) messages) between the base stations (eNB and WAP) 40, 42 and the core network 25 (e.g., one or more network servers 50), a Packet Data Network Gateway (PGW) to provide a gateway router to the Internet 65, and/or a Serving Gateway (SGW) to manage user data tunnels or connections between the base stations 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include a network entity, such as a network server (e.g., one or more servers) 50 that may be communicatively coupled to the base stations 40, 42. In an embodiment, the network server 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the network server (or one or more network servers) 50 may be combined to reduce a number of servers, including, for example, being combined in a single machine or module. In some embodiments, the network server 50 may be deployed inside the core network 25 or inside RAN 20 or 22 (as shown in FIG. 1). In general, eNB 40, WAP 42, and server 50 may physically be co-located in the same piece of hardware/machine, e.g., one or more computing devices.

According to various embodiments, the network 100 may be an Internet Protocol (IP) based network. For example, the core network 25 may be, at least in part, an IP based network, such as a packet switched (PS) network. Interfaces between network nodes (e.g., the one or more nodes 45) may be based on IP, including a backhaul connection to the base stations 40, 42. In some embodiments, the network may be enabled to provide connection with a circuit switched (CS) network (e.g., CS domain). In an embodiment, a UE may communicate with the network according to one or more communication protocols, such as, for example, Radio Resource Control (RRC) protocol adapted for LTE communication environment.

In some embodiments, the Internet Protocol (IP) flow mobility solution and packet-based bandwidth aggregation may be enhanced as described below. As will be appreciated by one skilled in the art, IP flow mobility solution is a mechanism for a UE to simultaneously connect to different radio access networks (e.g., 3GPP access network 20 and WLAN 22) and exchange different IP data flows communicated via the same public data network, for example, Internet 65, through these different accesses. The described techniques enable seamless IP flow mobility, with IP data flows belonging to the same or different applications (e.g., Skype®, YouTube®, and the like) being moved seamlessly between different radio access networks, such as 3GPP access network and WLAN.

Figure 2:
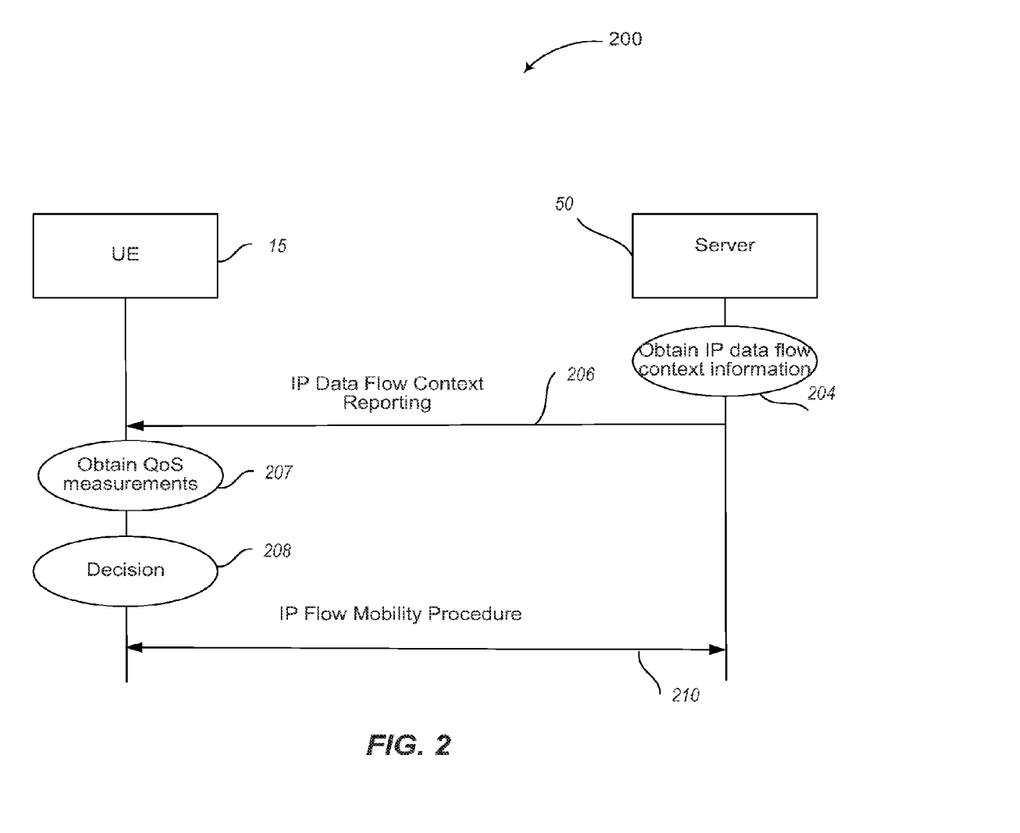
FIGS. 2 and 3 are block diagrams illustrating example communications between user equipment (UE), such as a wireless device, and a network server configured to operate on a wireless communication network in accordance with some embodiments.

FIG. 2 is a block diagram 200 illustrating example communications between UE (mobile device) and a network server configured to facilitate communications via multiple radio access networks using an enhanced IP flow mobility procedure in accordance with some embodiments. As the block diagram 200 illustrates, in some embodiments, the network server 50 (hereinafter "server") may obtain (e.g., conduct measurements of) IP data flow context information at 204. IP data flow context information may be used by the UE 15 or by the network server 50 to determine, for example, the performance requirements of the IP data flow and select for the communication of the IP data flow the suitable radio access network accordingly. In some embodiments, the server 50 may obtain such IP data flow context information by inspecting the payload of data packets included in the IP data flow, such as through Deep Packet Inspection (DPI).

In some embodiments, IP data flow context information (hereinafter "flow context information") may include the following parameters: Usage Index—an unsigned integer to index the usage of the IP data flow, e.g., voice call, video call, live streaming, FTP, Web browsing, etc.; Application Vendor Index—an unsigned integer to index the application vendor name of the flow, e.g., Skype®, YouTube®, Microsoft®, etc.; Application Version Index—an unsigned integer to index the version of the application; Flow Identification Information—a set of identification parameters configured to identify the IP data flow, such as IP address, port number, communication protocol type, and the like; Flow Direction—downlink, uplink, or both directions of the IP data flow; Flow ID—the identification of the IP data flow; Flow Status—active or idle; Preferred RAN—the identification of the RAN (e.g., BID) that may be used for the IP data flow due to its quality of service (QoS) requirements; and QoS IP Flow Mobility Triggers—number of triggers used to initiate IP flow mobility procedure. For each trigger, the trigger information may include a trigger type, e.g., delay variation, throughput, packet loss rate, receive time interval; trigger value, e.g., maximum delay variation, maximum receive time interval, minimum throughput, maximum packet loss rate, maximum number of consecutive packet losses; trigger measurement type, e.g., event or periodic; and trigger measurement interval, e.g., number of data packets or time units (for example, seconds or milliseconds).

The Flow Status field may allow the UE 15 to start or stop the corresponding IP flow mobility triggering algorithm described above. Generally, a triggering algorithm may stop whenever its corresponding IP data flow is idle. The trigger information may allow the server 50 to provide guidance on how the UE 15 should measure the QoS performance of an IP data flow (described below), and trigger IP flow mobility procedure accordingly. For example, the triggers listed above may inform the UE 15 which QoS data to measure and further inform the UE 15 about data thresholds (e.g., data loss rate threshold, delay threshold, and the like) that may trigger a decision regarding switching the IP data flow to a different radio access network, for example.

Accordingly, in some embodiments, the server 50 may continuously (or periodically) conduct DPI or other necessary operations to obtain the flow context information 204 on per-flow basis. In some embodiments, the server 50 may obtain flow context information 204 separately for downlink and uplink communications.

At 206, the server 50 may perform flow context information reporting by sending a flow context information report to the UE 15. In some embodiments, the server 50 may send the flow context information report unsolicited, for example, when a change in flow context information is detected, or in response to a request from the UE 15. In other embodiments, the server 50 may send the flow context information report periodically. In some embodiments, the flow context information report may be included in the existing communications between the server 50 and the UE 15, such as Binding Acknowledgement (BA) message. In other embodiments, the server 50 may be configured to generate a separate flow context information report message.

In response to receiving the flow context information report from the server 50, the UE 15 may obtain QoS measurements at 207 as instructed by the flow context information report. The UE 15 may then make a decision at 208 to initiate one or more actions associated with the IP data flow, based at least in part on the provided flow context information. In some embodiments, the decision may include selecting an appropriate radio access network for the IP data flow communication. For example, the decision may be made to associate the IP data flow with, or dissociate the IP data flow from, a specific radio access network, e.g., according to the IP flow mobility procedure. The decision may also include a determination to delete existing IP data flow(s) or create a new IP data flow. In some embodiments, the UE 15 may direct the server 50 to initiate one or more of the above-described actions. Accordingly, an IP flow mobility procedure may be conducted at 210 in accordance with the action(s) initiated by the UE 15 based on the flow context information.

In some embodiments, the operations described above, such as obtaining flow context information at 204, may be performed by the client (e.g., UE 15), and communicated to the server 50. The server 50 may make the decision at 208 regarding the IP data flow as described above. In other embodiments, the UE 15 may obtain flow context information at 204, obtain QoS measurements at 207, and make the decision at 208 regarding the IP data flow. However, such measurements and communication may consume a substantial amount of UE 15's power.

Figure 3:
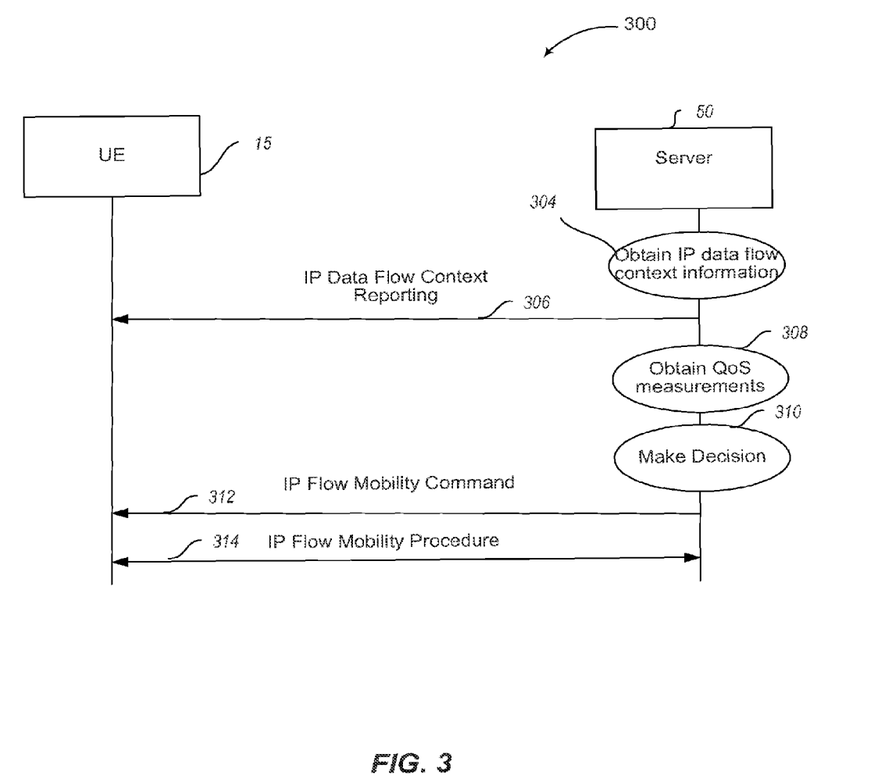

In general, the above described operations may be distributed between a server (e.g., 50) and a client (e.g., UE 15) or performed solely by the client or by the server depending on various factors, including power consumption, communication parameters, processor and memory capacity, and the like. FIG. 3 illustrates one example of such operation distribution.

FIG. 3 is a block diagram 300 is a block diagram 200 illustrating example communications between UE (mobile device) and a network server configured to facilitate communications via multiple radio access networks using an enhanced IP flow mobility procedure in accordance with some embodiments.

Similar to the operations described in reference to FIG. 2, the server 50 may obtain IP data flow context information 304 associated with IP data flow. The server 50 may send the IP data flow context report 306 to the UE 15. In general, the report 306 may include at least some of the values described above in reference to flow context measurements. More specifically, the report 306 may include values identifying a particular IP data flow, so that the UE 15 may be able to identify an IP data flow to manipulate (e.g., switch to a different radio access network) if necessary. Because in these embodiments the server 50 may perform QoS measurements 308, the server 50 may not need to send the trigger information defining the QoS measurements to the UE 15.

After obtaining the IP data flow context measurements 304 and QoS measurements 308, the server 50 may make a decision 310 about whether to switch the IP data flow identified at 304 to a different radio access network. Once the decision 310 is made, the server 50 may inform the UE 15 of that decision. More specifically, the server 50 may send an IP Flow Mobility command 312 to the UE 15. In some embodiments the command 312 may include the following information: Flow ID—the identification of the flow, and Preferred RAN—the identification of the radio access network (e.g., BID) that may be used for the IP data flow due to its QoS requirements.

More specifically, the Preferred RAN information may allow the server 50 to provide a recommendation as to which radio access network to be used for the identified IP data flow, assuming the server 50 is capable of measuring QoS performance and triggering IP flow mobility procedure accordingly. In response to the Flow Mobility command 312 from the server 50, the UE 15 may associate or dissociate the IP data flow from a specific radio access network according to the IP flow mobility procedure 314. The Flow Mobility command 312 may be included in the existing Binding Acknowledgement (BA) message that is sent from server 50 to the UE 15, or in a new message.

In some embodiments, in addition or in the alternative to the IP data flow enhancement techniques described in reference to FIGS. 2-3, data modification (e.g., data compression) techniques may be applied to data transmitted in the IP data flow, in order to reduce tunneling overhead. As known to one skilled in the art, a tunnel is a data connection established between a server and UE for communicating an IP data flow. For example, header compression may be applied to data packets comprising the IP data flow communicated between the server 50 and the UE 15 as described in reference to FIGS. 2-3. In some embodiments, packet header information may be used to support header compression of the transmitted data packets. For example, the server 50 may monitor and conduct measurements for transmissions of data packets (both downlink and uplink), and select the ones that may be used as a template for header compression. A header compression (HC) template is a list of static fields (IP address, port number, protocol type, etc.) of the data packet header that may not change per data packet. These fields may be removed from each packet during compression.

Packet header measurements may be performed by the UE 15, so that no additional message exchanges between the UE 15 and the network server 50 may be needed. In some embodiments, the packet header information may be measured by the server 50. The measurements may be reported to the UE 15, which then may make a decision (or delegate a decision making to the server) regarding modification of the data packets (e.g., packet header compression).

Figure 4:
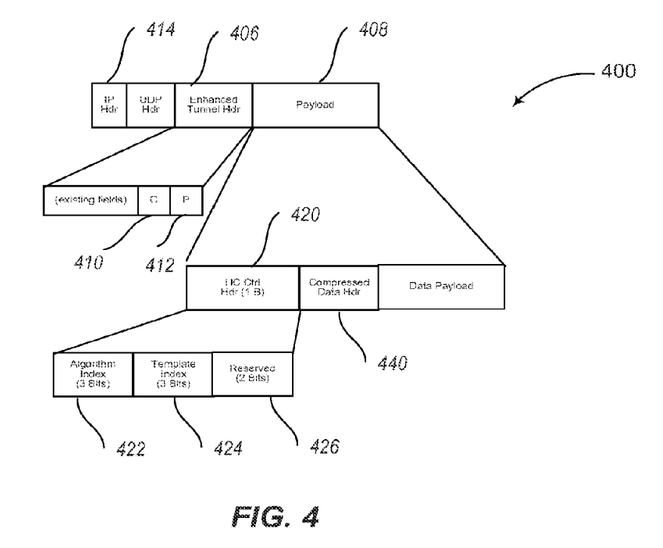
FIGS. 4 and 5 are examples of data packet formats configured to support header compression in communications between a network server and UE in a wireless communication network in accordance with some embodiments.
Figure 5:
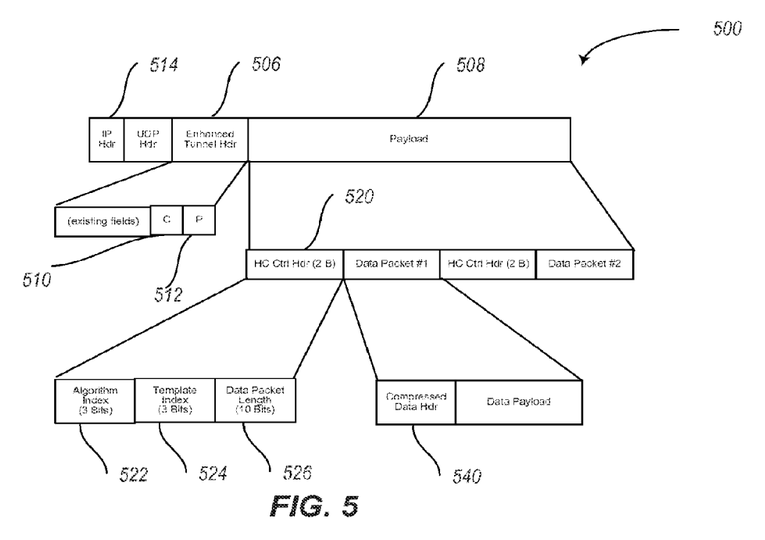

FIGS. 4 and 5 are example data packet formats configured to support header compression in communications between a network server and UE in a wireless communication network in accordance with some embodiments. More specifically, FIG. 4 illustrates data packet format 400 supporting header compression without data aggregation. FIG. 5 illustrates data packet format 500 supporting header compression with data aggregation. As illustrated in FIG. 5, payload 508 may differ from payload 408 in FIG. 4 by having multiple data packets (e.g., data packet 1 and data packet 2 as shown) due to data aggregation.

In order to support header compression, formats of the data packets of IP data flow may be modified. In some embodiments, the data packet format 400 may be modified by adding at least the following new fields in an enhanced tunnel header 406. The first field may be designated as "C" (Compression) 410 and may be at least a bit field to indicate whether header compression is used in the tunnel data packet. The second field may be designated as "P" (Priority) 412 and may be a n-bit field to indicate the priority of the tunnel data packet (e.g., the higher P value may indicate the higher priority of the data packet).

In case of data packet format modification with data aggregation (FIG. 5), the "P" field 512 in the tunnel header 506 may indicate the priority of the data packet with the highest priority in the tunnel data packet, and the "C" field 510 may be set if any data packet in the tunnel uses header compression. The length of the "P" field 512 may depend, for example, on how many levels of priorities may be needed. For example, in case of two levels of priorities, low and high, the "P" field 512 may include one bit configured to be set to "0" or "1" respectively.

In general, the usage of the "C" field may be to notify the receiver side (e.g., UE or server) how to decode the payload since it may be possible that not all data packets in the tunnel use header compression. The "P" field may allow a radio access network through facilitating the tunnel to identify the priority of a tunnel data packet even though all data packets may be delivered (e.g., via the core network 25) through the same IP data flow via the tunnel Typically, a radio access network may be configured to identify the priority of a packet based on its IP header 414 (514). However, such information may be lost due to header compression described herein. Accordingly, assume that the radio access network knows tunnel header format in advance in order to decode the "P" field correctly.

Next, a Header Compression (HC) Control header 420 (520) for each data packet may be added to the data packet format 400 (500) that is put in the tunnel packet payload. The HC control header 420 (520) may include at least the following fields. A first field may be designated as HC Algorithm Index 422 (522) and may include an unsigned integer to indicate the HC algorithm used for header compression. A second field may be designated as HC Template Index 424 (524) and may include an unsigned integer to indicate the HC template used for header compression. A third field may be designated as Data Packet Length 526 and may include an unsigned integer to indicate the size of each data packet. Data Packet Length 526 (a reserved field 426 in FIG. 4) may be included in the data packet format when aggregation is active and there are multiple packets in the same payload, as illustrated in FIG. 5. Accordingly, when all three fields 422 (522), 424 (524), and 526 are set to "0", this may indicate that the data packet header is not compressed.

The mapping between HC Algorithm Index and the actual compression algorithm may be predefined and known to both UE and server. Generally, HC Algorithm Index and HC Template Index may be needed by the receiver to decode the Compressed Data Header 430 (530) of the data packet. Data Packet Length may be used to separate multiple data packets in the same tunnel data packet.

Figure 6:
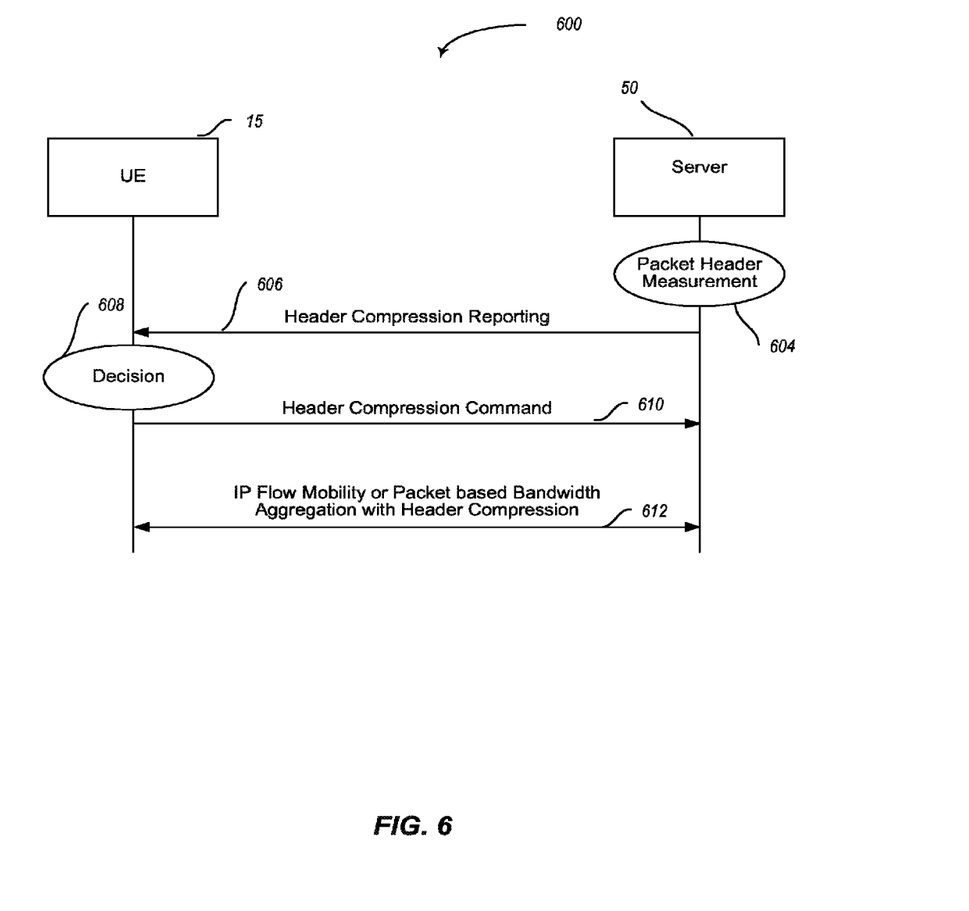
FIG. 6 is another block diagram illustrating example communications between UE and a network server configured to operate on a wireless communication network in accordance with some embodiments.

FIG. 6 is a block diagram 600 illustrating example communications between UE and a server configured to operate on a wireless communication network to implement header compression procedure, in accordance with some embodiments. In some embodiments, the server 50 may continuously or periodically perform packet header measurement 604 in order to select the packet headers that may be used as template for header compression. The server may provide a header compression measurement report 606 to the UE 15.

In some embodiments, the report may include the following information measured at 604 for each selected packet header: direction—downlink or uplink direction of IP data flow; HC Algorithm Index—the type of HC algorithm to be used to encode and decode the header, Header Template Content Length—the length of the Header Template Content, Header Template Content—the content of the header template, and Packet Ratio—the ratio of the number of packets using the header template to the total number packets. Packet Ratio may be used by the UE 15 to further select a subset of the reported headers for the active header templates.

In response, the UE 15 may make a decision 608, namely, determine, or direct the server 50 to determine, to perform header compression operations associated with the IP data flow. For example, the UE 15 may determine to initiate, stop, or update header compression operations associated with the IP data flow, based in part on the provided packet header information. These operations may include: reporting header compression measurements, activating header compression or deactivating the header compression. In some embodiments, the header compression may include uplink or downlink header compression. In some embodiments, the header compression may include performing compression of a header of at least some data packets in the IP data flow based at least in part on the packet header measurements.

In some embodiments, the UE 15 may make the above determination 608 based in part on its own measurements. For example, the header compression measurement report provided by the server 50 may not include, in some instances, information that may trigger the decision 608. The UE 15 may use different types of events triggering the decision 608. For example, the UE 15 may detect network performance degradation due to congestion. Detecting the congestion and/or performance degradation may server as a trigger to initiate header compression procedure. If network congestion stops or gets reduced to an acceptable level, header compression procedure may end. In general, changes in network performance, quality of service, network congestion, and the like may server as a trigger for header congestion operations.

In some embodiments, the UE 15 may send a Header Compression command 610 to the server 50, corresponding to the decision 608. For example, the command may include a request type and a number of active HC templates. The request type may include: Bit #0—request the server to report HC measurement results; Bit #1—notify the server to activate or deactivate downlink HC; Bit #2—notify the server to activate or deactivate uplink HC; and Others—reserved. The number of active HC templates may be present in the command if Bit #1 or Bit #2 in the request type field is set to 1.

A set of the following fields may be included in the command for each active HC template: Direction, HC Algorithm Index, HC Template Index, Header Template Length, and Header Template Content. These fields were described above in reference to 606. Based on the Header Compression command 610, the IP flow mobility procedure 612 may be updated with the header compression with or without data aggregation as described above.

In addition to the above-described IP flow mobility procedure enhancement techniques, tunnel resource management techniques will be described herein that provide for further enhancement of communications between the server and multiple client wireless devices (clients), such as UEs operating on more than one radio access networks. Typically, tunnel resource management solutions may involve allocating resources across different radio access network for the same user (UE). Accordingly, a radio access network may be responsible for managing resources among different UEs operating on the same network.

Figure 7:
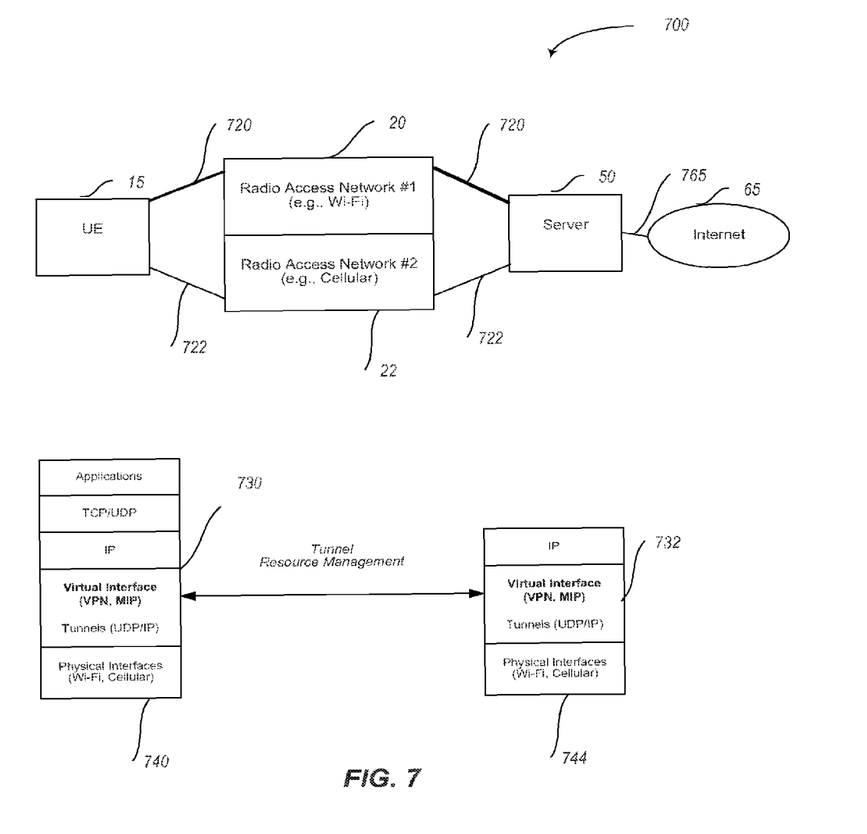
FIG. 7 is a block diagram illustrating a wireless communication system operating on at least radio access networks and schematic depictions of protocols used in such operation, in accordance with some embodiments.

FIG. 7 illustrates a simplified block diagram 700 of the network 100, including UE 15, connected to server 50 via one or more radio access networks 1 (20) and 2 (22), through data connections (tunnels) 720 and 722, wherein the server facilitates a connection 765 with a data network (e.g., Internet) 65. The tunnel management techniques described herein provide for a RAN-agnostic method that operates at a virtual interface between UE 15 and server 50, and manages resource for the users (UEs) in the same radio access network by controlling a data rate to be sent on downlink or uplink in the data connection (tunnel) 720 or 722 between the UE 15 and server 50. More specifically, the mobility management protocols may be enhanced with new messages (e.g., based on Binding Update/ACK in Mobile IP) so that the server 50 may be configured to identify the clients (UEs) sharing the same RAN without requiring any support from the RAN.

In some embodiments, the UE 15 may be connected with two RANs (e.g., 20 and 22) simultaneously, via two tunnels 720 and 722. Each tunnel 720, 722 may be identified by a unique identifier, called "Binding ID." The tunnel resource management techniques described herein may operate at a virtual interface 730-732, e.g., Mobile IP, Virtual Private Network, etc., between UE 15 and server 50, added to the protocol stacks 740 (associated with the UE 15) and 744 (associated with the server 50). The described tunnel resource management techniques are based on controlling a tunneling rate of a communication between a UE and a server in a tunnel, by determining a maximum allowed tunneling rate for such communication.

The maximum tunneling rate may be defined as the maximum data rate that the UE 15 or the server 50 is allowed to transmit in a tunnel (e.g., 720 or 722). The maximum tunnel rate may indicate a number of data units per unit of time to be communicated, such as a number of data packets per second or bytes per second. Controlling the tunnel rate of the UEs that are operating in the same network (e.g., RANs 20 or 22) may mitigate the impact of contention and provide better QoS or fairness, particularly in the circumstances when there is lack of such control at the radio access network, due to technology cost constraints, deployment issues, or any other reasons.

Figure 8:
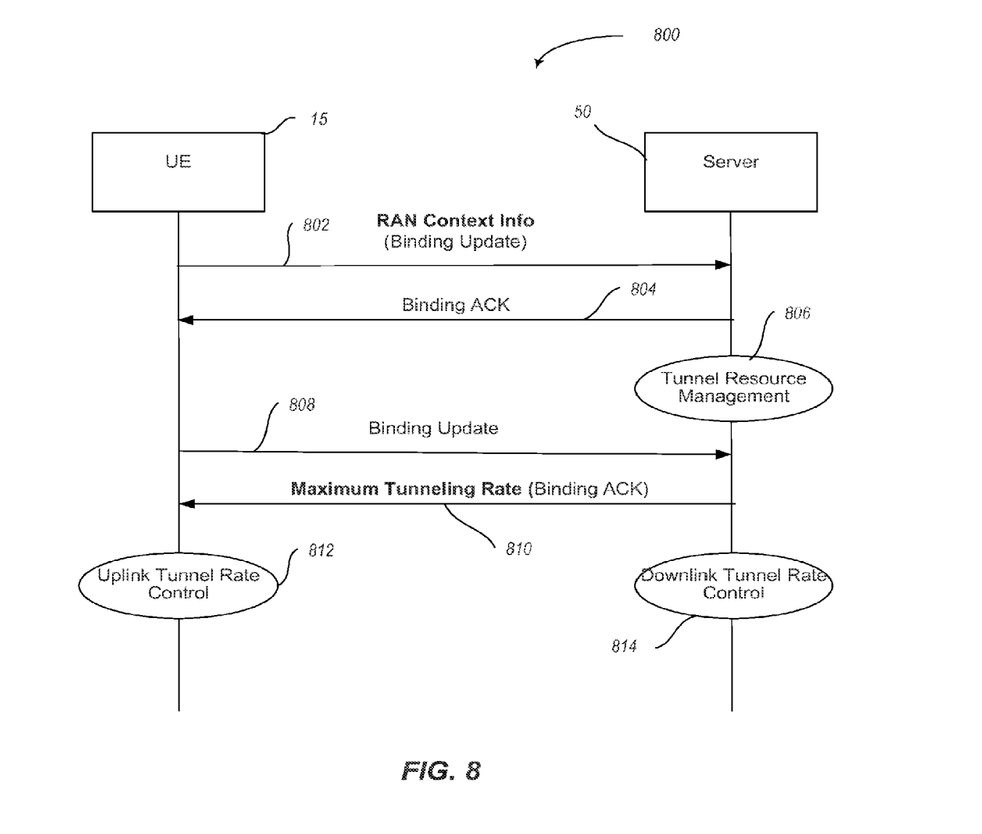
FIG. 8 is another block diagram illustrating example communications between UE and a server configured to operate on at least two radio access networks in accordance with some embodiments.

FIG. 8 is a block diagram 800 illustrating tunnel resource management operation in communications between UE 15 and server 50 configured to operate on at least two wireless communication networks 20, 22 in accordance with some embodiments. The tunnel resource management operates as follows. The UE 15 may send RAN Context Information 802 to the server 50. In some embodiments, the UE may use for this purpose a signaling message, such as Binding Update. RAN Context Information may include the following parameters: Binding ID (BID) used to identify the RAN/tunnel, Network Type, e.g., WiFi, Cellular. If the RAN is identified as Wi-FI, for example, the RAN Context Information may further include Serving WiFi BSSID (Basic Service Set ID); List of Neighboring WiFi BSSID; Channel, e.g., 1, 6, 11; Mode, e.g., 802.11a, b, g, n; and Data Rate, e.g., 54 Mbps, 11 Mbps; RSSI, e.g. −60 dBm.

If the RAN is identified as a cellular network, the RAN Context Information may further include Cell ID, Signal Strength, and Network Type, e.g., EDGE, HSPA, HSPA+, LTE, etc. Cell ID, such as GSM Cell ID (CID) is a generally unique number used to identify each base transceiver station (BTS) or sector of a BTS within a location area code (LAC) if not within a GSM network. Serving Wi-Fi BSSID and Cell ID may be used by the server 50 to identify which UEs are in the same network, and therefore should be coordinated when determining their maximum tunnel rate. Per employed communication protocol, the server 50 may send a Binding Acknowledgement (Binding ACK) message 804 to the UE 15, acknowledging the receipt of the message 802.

The server 50 may conduct tunnel resource management operations 806. For example, the server 50 may determine maximum tunneling rate for the UE 15, based on the RAN Context Information provided by the UE 15. This determination may be based at least in part on the RAN Context Information 802, as well as other local measurements such as throughput, delay, data loss, and/or other performance parameters associated with the RAN. In some embodiments, the maximum tunneling rate determination for the UE 15 may be further based not only the RAN Context information provided by the UE 15, but also RAN context information provided by some or all other clients operating on the same RAN, which may be known from their respective reported RAN context information. Maximum tunneling rate may include the following parameters: BID, maximum uplink rate, and maximum downlink rate.

The UE may send a Binding Update message 808 to the server 50 if warranted by the communication protocol. The server 50 may provide the determined maximum tunneling rate 810, e.g., in its Binding ACK message to the UE 15, effectively assigning a new tunneling rate to the UE 15. In some embodiments, the UE 15 may control uplink traffic based on the Uplink Tunneling Rate 812, and the server 50 may control downlink traffic based on the Downlink Tunneling Rate 814.

Figure 9:
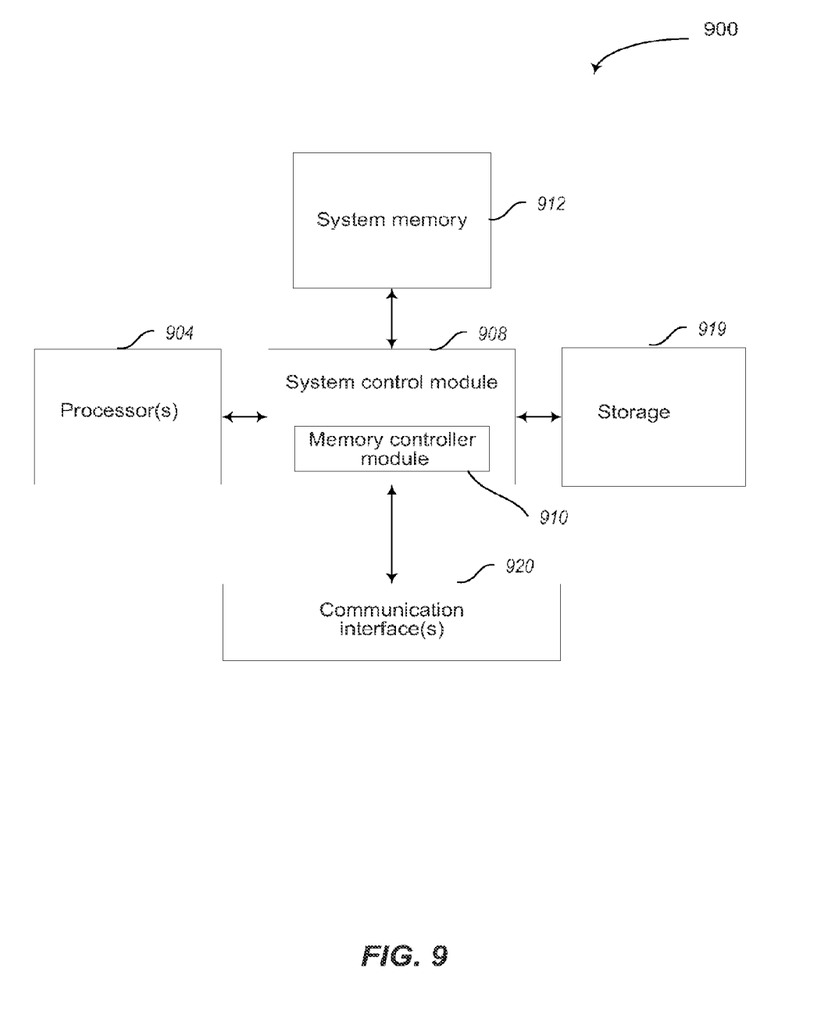
FIG. 9 illustrates an example system that may be used to practice various embodiments described herein.

Embodiments of the present disclosure may be implemented into a system using any suitable hardware and/or software to configure as desired. FIG. 9 schematically illustrates an example system that may be used to practice various embodiments described herein. FIG. 9 illustrates, for one embodiment, an example system 900 having one or more processor(s) 904, system control module 908 coupled to at least one of the processor(s) 904, system memory 912 coupled to system control module 908, non-volatile memory (NVM)/storage 919 coupled to system control module 908, and one or more communications interface(s) 920 coupled to system control module 908.

In some embodiments, the system 900 may be capable of functioning as the UE 15 as described herein. In other embodiments, the system 900 may be capable of functioning as the one or more nodes 45 of FIG. 1, network server 50 of FIGS. 2-3 and 6-8 or otherwise provide logic/module that performs functions as described for eNB 40, 42 and/or other modules described herein. In some embodiments, the system 900 may include one or more computer-readable media (e.g., system memory or NVM/storage 919) having instructions and one or more processors (e.g., processor(s) 904) coupled with the one or more computer-readable media and configured to execute the instructions to implement a module to perform actions described herein.

System control module 908 for one embodiment may include any suitable interface controllers to provide for any suitable interface to at least one of the processor(s) 904 and/or to any suitable device or component in communication with system control module 908.

System control module 908 may include memory controller module 910 to provide an interface to system memory 912. The memory controller module 910 may be a hardware module, a software module, and/or a firmware module.

System memory 912 may be used to load and store data and/or instructions, for example, for system 900. System memory 912 for one embodiment may include any suitable volatile memory, such as suitable DRAM, for example. In some embodiments, the system memory 912 may include double data rate type four synchronous dynamic random-access memory (DDR4 SDRAM).

System control module 908 for one embodiment may include one or more input/output (I/O) controller(s) to provide an interface to NVM/storage 919 and communications interface(s) 920.

The NVM/storage 919 may be used to store data and/or instructions, for example. NVM/storage 919 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 919 may include a storage resource physically part of a device on which the system 900 is installed or it may be accessible by, but not necessarily a part of, the device. For example, the NVM/storage 919 may be accessed over a network via the communications interface(s) 920.

Communications interface(s) 920 may provide an interface for system 900 to communicate over one or more network(s) and/or with any other suitable device. The system 900 may wirelessly communicate with the one or more components of the wireless network in accordance with any of one or more wireless network standards and/or protocols.

For one embodiment, at least one of the processor(s) 904 may be packaged together with logic for one or more controller(s) of system control module 908, e.g., memory controller module 910. For one embodiment, at least one of the processor(s) 904 may be packaged together with logic for one or more controllers of system control module 908 to form a System in Package (SiP). For one embodiment, at least one of the processor(s) 904 may be integrated on the same die with logic for one or more controller(s) of system control module 908. For one embodiment, at least one of the processor(s) 904 may be integrated on the same die with logic for one or more controller(s) of system control module 908 to form a System on Chip (SoC).

In various embodiments, the system 900 may be, but is not limited to, a server, a workstation, a desktop computing device, or a mobile computing device (e.g., a laptop computing device, a handheld computing device, a tablet, a netbook, etc.). In various embodiments, the system 900 may have more or less components, and/or different architectures. For example, in some embodiments, the system 900 may include one or more of a camera, a keyboard, liquid crystal display (LCD) screen (including touch screen displays), non-volatile memory port, multiple antennas, graphics chip, application-specific integrated circuit (ASIC), and speakers.

The embodiments described herein may be further illustrated by the following examples. Example 1 is apparatus for facilitating management of data flow, comprising: one or more computer-readable media having instructions; and one or more processors coupled with the one or more computer-readable media and configured to execute the instructions to: measure flow context information based on data extracted from an internet protocol (IP) data flow between a user equipment (UE) and a network entity operating on a wireless network; and provide the measured flow context information to the UE to facilitate management of one or more IP data flows by the UE.

Example 2 may include the subject matter of Example 1, and further specifies that the management of one or more IP data flows may include selecting by the UE, or directing the network entity to select, a radio access network from one or more radio access networks available for communicating the IP data flow between the UE and the network entity, based at least in part on the provided flow context information.

Example 3 may include the subject matter of Example 1, and further specifies that the flow context information may include at least one of: usage index, application vendor index, application version index, IP flow identification information, Flow ID, Flow Status, Preferred RAN, or QoS IP Flow Mobility Triggers.

Example 4 may include the subject matter of Example 1, and further specifies that the one or more processors are further configured to execute the instructions to measure quality of service information, or initiate measurements of the quality of service information by the UE, wherein the measurements are based at least in part the measured flow context information, wherein the management of one or more IP data flows is based at least in part on the quality of service information.

Example 5 may include the subject matter of Example 1, and further specifies that the network entity may include a network server configured to operate on one or more radio access networks available for communicating the IP data flow between the UE and the network server.

Example 6 may include the subject matter of any of Examples 1 to 5, and further specifies that the one or more processors are further configured to execute the instructions to: measure packet header information associated with data packets included in the IP data flow; and provide the measured packet header information to the UE to facilitate header compression operations associated with the IP data flow.

Example 7 may include the subject matter of Example 6, and further specifies that the header compression operations may include initiating, stopping, or updating header compression associated with the IP data flow, based on the provided packet header information.

Example 8 may include the subject matter of Example 6, and further specifies that the packet header information may include at least one of: direction of a data packet, header compression algorithm index, header template length, header template content, or packet ratio.

Example 9 may include the subject matter of Example 6, and further specifies that the header compression includes performing compression of a header of each data packet based at least in part on the packet header information.

Example 10 may include the subject matter of Example 9, and further specifies that performing compression of the header includes selecting a header template for the data packets and associating the selected header template with each of the data packets.

Example 11 may include the subject matter of Example 6, and further specifies that the one or more processors are configured to execute the instructions to update a format of the data packet by being adapted to add a plurality of indicators to the format of the data packet, which include a compression indicator, a priority indicator, and a header compression control header; and populate the added indicators with values, each value indicating a status of a corresponding entity.

Example 12 may include an apparatus for facilitating management of data flow, comprising: one or more computer-readable media having instructions; and one or more processors coupled with the one or more computer-readable media and configured to execute the instructions to: receive context information, related to a radio access network, from a client configured to communicate with the apparatus via a data connection established through a radio access network; determine, based at least in part on the context information, a data rate for the client based at least in part on context information received from other clients, the data rate indicating an upper limit of data units per unit of time to be communicated between the client and the apparatus via the data connection; and determine data rates for the other clients based at least in part on the context information received from the other clients and from the client.

Example 13 may include the subject matter of Example 12, and further specifies that the one or more processors are configured to execute the instructions to provide the data rates to the other clients, the other clients including mobile wireless devices.

Example 14 may include the subject matter of Example 12, and further specifies that the one or more processors are configured to execute the instructions to provide the data rate to the client.

Example 15 may include the subject matter of any of Examples 12 to 14, and further specifies that one or more processors are further configured to execute the instructions to determine the data rate based in part on measurements of performance parameters associated with the radio access network.

Example 16 may include the subject matter of Example 15, and further specifies that the performance parameters include at least one of a throughput, delay, or data loss.

Example 17 may include the subject matter of Example 12, and further specifies that the apparatus comprises a wireless network server, and wherein the radio access network includes one of a cellular network and a local area network.

Example 18 may include the subject matter of Example 12, and further specifies that the wireless network context information includes a wireless network identifier associated with the radio access network through which the data connection is established.

Example 19 may be a computer-implemented method for facilitating management of data flow, comprising: receiving, by a computing device, flow context information based on data extracted from an internet protocol (IP) data flow between the computing device and another computing device over a radio access network; and initiating, by the computing device, one or more actions associated with the IP data flow, based at least in part on the provided flow context information, the one or more actions including switching the IP data flow from the radio access network to another radio access network, the another radio access network selected from one or more wireless networks available for communicating the IP data flow.

Example 20 may include the subject matter of Example 19, and further specifies that the one or more actions include: associating, by the computing device, the IP data flow with the another radio access network; disassociating, by the computing device, the IP data flow from the radio access network; deleting, by the computing device, the IP data flow; or creating, by the computing device, a new IP data flow.

Example 21 may include the subject matter of Example 19, and further specifies that the flow context information includes at least one of: usage index, application vendor index, application version index, IP flow identification information, Flow Status, Flow ID, Preferred RAN, or QoS IP Flow Mobility Triggers.

Example 22 may include the subject matter of any of Examples 19 to 21, and further specifies that the method may further comprise: receiving, by the computing device, packet header information associated with data packets included in the IP data flow; and determining, by the computing device, whether to initiate, stop, or update header compression operations associated with the IP data flow, based on the provided packet header information.

Example 23 may include at least one computing device-readable storage medium having executable instructions for facilitating management of data flow stored thereon that, in response to execution by a computing device, cause the computing device to: receive wireless network context information from each of a plurality of wireless devices configured to communicate with the computing device via a data connection established through one of a plurality of radio access networks; and determine, based at least in part on the context information, a data rate for each of the plurality of wireless devices, the data rate indicating an upper limit of data units per unit of time to be communicated between a respective wireless device and the computing device via the data connection.

Example 24 may include the subject matter of Example 23, and further specifies that the executable instructions further cause the computing device to provide the data rates to the respective wireless devices.

Example 25 may include the subject matter of any of Examples 23 to 24, and further specifies that the wireless devices include at least one of a smartphone, a tablet computer, an ultrabook, a desktop, or a laptop.

Example 26 may include an apparatus for facilitating management of data flow, comprising: means for receiving flow context information based on data extracted from an internet protocol (IP) data flow between the computing device and another computing device over a radio access network; and means for initiating one or more actions associated with the IP data flow, based at least in part on the provided flow context information, the one or more actions including switching the IP data flow from the radio access network to another radio access network, the another radio access network selected from one or more wireless networks available for communicating the IP data flow.

Example 27 may include the subject matter of Example 26, and further specifies that the means for initiating one or more actions associated with the IP data flow include: means for associating the IP data flow with the another radio access network; means for disassociating the IP data flow from the radio access network; means for deleting the IP data flow; and means for creating a new IP data flow.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for facilitating management of data flow, comprising:
   one or more computer-readable media having instructions; and
   one or more processors coupled with the one or more computer-readable media and configured to execute the instructions to:
      measure flow context information based on data extracted from an internet protocol (IP) data flow between a user equipment (UE) and a network entity operating on a wireless network, including measure packet header information associated with data packets included in the IP data flow; and
      provide the measured flow context information, including the measured packet header information, to the UE to facilitate management of one or more IP data flows by the UE, wherein to facilitate management includes to facilitate management of header compression operations associated with the IP data flow, wherein the header compression operations include compression of a header of each data packet based at least in part on the packet header information, including selection of a header template for the data packets and association of the selected header template with each of the data packets.

2. The apparatus of claim 1, wherein the management of one or more IP data flows includes selecting by the UE, or directing the network entity to select, a radio access network from one or more radio access networks available for communicating the IP data flow between the UE and the network entity, based at least in part on the provided flow context information.

3. The apparatus of claim 1, wherein the flow context information includes at least one of: usage index, application vendor index, application version index, IP flow identification information, Flow ID, Flow Status, Preferred RAN, or QoS IP Flow Mobility Triggers.

4. The apparatus of claim 1, wherein the one or more processors are further configured to execute the instructions to measure quality of service information, or initiate measurements of the quality of service information by the UE, wherein the measurements are based at least in part the measured flow context information, wherein the management of one or more IP data flows is based at least in part on the quality of service information.

5. The apparatus of claim 1, wherein the network entity includes a network server configured to operate on one or more radio access networks available for communicating the IP data flow between the UE and the network server.

6. The apparatus of claim 1, wherein the header compression operations include initiating, stopping, or updating header compression associated with the IP data flow, based on the provided packet header information.

7. The apparatus of claim 1, wherein the packet header information includes at least one of: direction of a data packet, header compression algorithm index, header template length, header template content, or packet ratio.

8. The apparatus of claim 1, wherein the one or more processors are configured to execute the instructions to update a format of the data packet by being adapted to add a plurality of indicators to the format of the data packet, which include a compression indicator, a priority indicator, and a header compression control header; and populate the added indicators with values, each value indicating a status of a corresponding entity.

9. A computer-implemented method for facilitating management of data flow, comprising:
   receiving, by a computing device, flow context information based on data extracted from an internet protocol (IP) data flow between the computing device and another computing device over a radio access network, including packet header information associated with data packets included in the IP data flow; and
   initiating, by the computing device, one or more actions associated with the IP data flow, based at least in part on the provided flow context information, the one or more actions including switching the IP data flow from the radio access network to another radio access network, the another radio access network selected from one or more wireless networks available for communicating the IP data flow, the one or more actions further including initiating header compression operations associated with the IP data flow, the header compression operations including compressing a header of each data packet based at least in part on the packet header information, including selecting a header template for the data packets and associating the selected header template with each of the data packets.

10. The computer-implemented method of claim 9, wherein the one or more actions further include:
  associating, by the computing device, the IP data flow with the another radio access network;
  disassociating, by the computing device, the IP data flow from the radio access network;
  deleting, by the computing device, the IP data flow; or
  creating, by the computing device, a new IP data flow.

11. The computer-implemented method of claim 9, wherein the flow context information includes at least one of: usage index, application vendor index, application version index, IP flow identification information, Flow Status, Flow ID, Preferred RAN, or QoS IP Flow Mobility Triggers.

12. The computer-implemented method of claim 9, further comprising:
  determining, by the computing device, whether to initiate, stop, or update header compression operations associated with the IP data flow, based on the provided packet header information.

13. A computer-implemented method for facilitating management of data flow, comprising:
  measuring, by a computing device, flow context information based on data extracted from an internet protocol (IP) data flow between a user equipment (UE) and a network entity operating on a wireless network, including measuring packet header information associated with data packets included in the IP data flow; and
  providing, by the computing device, the measured flow context information, including the measured packet header information, to the UE, to facilitate management of one or more IP data flows by the UE, wherein facilitating management includes facilitating management of header compression operations associated with the IP data flow, wherein the header compression operations include compressing a header of each data packet based at least in part on the packet header information, including selecting a header template for the data packets and associating the selected header template with each of the data packets.

14. The computer-implemented method of claim 13, wherein performing header compression operations includes selecting or causing the UE to select, by the computing device, a radio access network from one or more radio access networks available for communicating the IP data flow between the UE and the network entity, based at least in part on the provided flow context information.

15. The computer-implemented method of claim 13, further comprising: measuring quality of service information, or initiating measurements, by the computing device, of the quality of service information by the UE, wherein the measurements are based at least in part the measured flow context information, wherein the management of one or more IP data flows is based at least in part on the quality of service information.

16. An apparatus for facilitating management of data flow, comprising:
  one or more computer-readable media having instructions; and
  one or more processors coupled with the one or more computer-readable media and configured to execute the instructions to:
  receive flow context information based on data extracted from an internet protocol (IP) data flow between the computing device and another computing device over a radio access network, including packet header information associated with data packets included in the IP data flow; and
  initiate one or more actions associated with the IP data flow, based at least in part on the provided flow context information, the one or more actions including a switch of the IP data flow from the radio access network to another radio access network, wherein the another radio access network is selected from one or more wireless networks available for communicating the IP data flow, wherein the one or more actions further include: initiate header compression operations associated with the IP data flow, wherein the compression operations include compression of a header of each data packet based at least in part on the packet header information, such as selection of a header template for the data packets and association of the selected header template with each of the data packets.

17. The apparatus of claim 16, wherein the one or more actions further include: associate the IP data flow with the another radio access network; disassociate the IP data flow from the radio access network; delete the IP data flow; or create a new IP data flow.

18. The apparatus of claim 16, wherein the one or more processors are further configured to execute the instructions to determine whether to initiate, stop, or update header compression operations associated with the IP data flow, based on the provided packet header information.

* * * * *